United States Patent [19]

Madrid et al.

[11] 3,930,719
[45] Jan. 6, 1976

[54] EDGE BRIGHTNESS DISPLAY AND METHOD USING A MATERIAL EXHIBITING DIELECTRIC ANISOTROPY

[75] Inventors: Robert W. Madrid, Macedon; Joseph J. Wysocki, Webster, both of N.Y.

[73] Assignee: Xerox Corporation, Stamford, Conn.

[22] Filed: Apr. 9, 1973

[21] Appl. No.: 349,504

[52] U.S. Cl. ........ 350/160 LC; 350/150; 350/160 R
[51] Int. Cl. .............................................. G02f 1/26
[58] Field of Search .............................. 350/160 LC

[56] References Cited
UNITED STATES PATENTS

| | | | |
|---|---|---|---|
| 3,512,876 | 5/1970 | Marks | 350/160 LC X |
| 3,540,769 | 11/1970 | Goldmacher et al. | 350/160 LC |
| 3,697,150 | 10/1972 | Wysocki | 350/160 LC X |
| 3,718,382 | 2/1973 | Wysocki et al. | 350/160 LC |
| 3,790,251 | 2/1974 | Wysocki et al. | 350/160 LC |

Primary Examiner—Ronald L. Wibert
Assistant Examiner—Matthew W. Koren
Attorney, Agent, or Firm—James J. Ralabate; David C. Petre; George J. Cannon

[57] ABSTRACT

A dielectric anisotropic material provided in its optical uniaxial state is caused to alter its optical properties along electrode edges by shorting electrodes, changing potential or otherwise modifying the application of an applied electrical field parallel to the optical axis of the dielectric anisotropic material. Electro-optic cells and imaging systems are disclosed using the edge effect accompanying the modification of the applied electrical field.

16 Claims, 6 Drawing Figures

EDGE BRIGHTNESS DISPLAY AND METHOD USING A MATERIAL EXHIBITING DIELECTRIC ANISOTROPY

BACKGROUND OF THE INVENTION

This invention relates to electro-optic systems, and more specifically, to an electro-optic system wherein a dielectric anisotropic material in its optically uniaxial state is used. Furthermore, this invention includes electro-optic cells and imaging systems embodying the inventive dielectric anisotropic electro-optic system.

Dielectric anisotropic materials include some of the liquid crystalline materials, and non-liquid crystalline materials such as anisotropic particles in carrier fluids.

Recently, there has been substantial interest in the discovery of more useful applications for the class of substances known as "liquid crystals." The name liquid -crystals has become generic to liquid crystalline materials which exhibit dual physical characteristics, some of which are typically associated with liquids and others which are typically unique to solids. Liquid crystals exhibit mechanical characteristics, such as viscosities, which are normally associated with liquids. The optical characteristics of liquid crystals are more similar to those characteristics ordinarily unique to crystalline solids. In liquids or fluids, the molecules are typically randomly distributed and oriented throughout the mass of the material. Conversely, in crystalline solids the molecules are generally rigidly oriented and arranged in a specific crystalline structure. Liquid cyrstals resemble solid crystals in that the molecules of the liquid crystalline compositions are regularly oriented in a fashion analogous to, but less extensive than, the molecular orientation and structure in a crystalline solid. Many substances have been found to exhibit liquid crystalline characteristics in a relatively narrow temperature range; below the temperature range the substance typically appear as crystalline solids, and above that temperature range they typically appear as liquids. Liquid crystals are known to appear in three different mesomorphic forms; the smectic, the nematic and cholesteric. In each of these structures, the molecules are typically arranged in a unique orientation. In the nematic liquid crystalline mesophase structure, the major axes of the molecules lie approximately parallel to each other, but the molecules are typically not specifically organized in any other fashion.

Nematic liquid crystals are known to be responsive to electrical fields, and have been used in various electro-optic cells and imaging systems, for example as disclosed in Williams U.S. Pat. No. 3,322,485, Freund et al., U.S. Pat. 3,364,433; Heilmeier et al., U.S. Pat. No. 3,499,112; and Goldmacher et al., U.S. Pat. No. 3,499,702. Most of the known nematic liquid crystalline light valves and display devices make use of the dynamic light scattering characteristics of layers of nematic liquid crystalline material which have electrical fields placed across the thickness of the layer. The dynamic light scattering is believed to be due to the differential alignment of domains or swarms of birefringent liquid crystalline molecules in the electric field affected areas in such systems.

In the smectic structure the molecules are arranged in layers with their major axes approximately parallel to each other and approximately normal to the planes of said layers. Within a given layer the molecules may be organized in uniform rows, or randomly distributed throughout the layer, but in either case the major axes are still approximately normal to the plane of the layer. The attractive forces between layers are relatively weak so that the layers are free to move in relation to each other, thereby providing the smectic liquid crystalline substance with the mechanical properties of a planar or two-dimensional, soap-like fluid.

In the cholesteric structure, the molecules are believed to be arranged in definite layers as in the smectic structure; however, within a given layer, the molecules are believed to be arranged with their major axes approximately parallel in a fashion resembling the structure of nematic liquid crystals. Because the major axes of the molecules in the cholesteric structure are believed to be parallel to the planes of the layers, the molecular layers are very thin. The cholesteric structure derives its name from the fact that materials exhibiting the cholesteric liquid crystalline structure typically have molecules which are derivatives of cholesterol or which are shaped very similarly to molecules of cholesterol. Because of the shape of the cholesteric molecule, in the cholesteric structure the direction of the major axes of the molecules in each of the aforementioned thin layers is displaced slightly from the direction of the major molecular axes in the adjacent molecular layers. When compared to a hypothetical straight line axis passing through a cholesteric liquid crystalline substance and perpendicular to the molecular planes within said substance, the angular displacement of the direction of the molecular axes within each adjacent molecular layer traces out a helical path around the hypothetical straight line axis.

Cholesteric liquid crystals are known to be responsive to electrical fields (see Harper, W. J. "Voltage Effects in Cholesteric Liquid Crystals," in Molecular Crystals, Vol. 1, 1966, pages 325–332). The effects of an electrical field upon a sample of a liquid crystalline substance has typically been observed in a cell comprising a film of liquid crystals sandwiched between transparent electrodes, as disclosed, for example in copending application Ser. No. 646,532, filed June 16, 1967, now U.S. Pat. No. 3,804,618 and French Pat. No. 1,484,584. In both of these references liquid crystals are used for imaging in response to electrical fields. The imaging in prior art devices has typically comprised modification of the optical properties of the liquid crystalline substance maintaining its original liquid crystalline mesophase form, i.e., smectic, nematic, or cholesteric. Recently, however, NMR spectral studies have shown that a magnetic field may cause a cholesteric liquid crystalline substance to go through a phase transition to the nematic liquid crystalline structure (see Sackmann, Meiboom, and Snyder, "On the Relation of Nematic to Cholesteric Mesophases," in J. Am. Chem. Soc., 89:73, Nov. 8, 1967). Also, U.S. Pat. No. 3,652,148, Wysocki et al, discloses the application of an electrical field to transform a cholesteric liquid crystal to a nematic liquid crystalline structure.

Recently, Haas et al., U.S. Pat. No. 3,687,515 disclosed an electroc-optic system wherein a layer of spontaneously homeotropic textured optically uniaxial nematic liquid crystalline composition with the optic axis normal to the plane of the layer was rendered optically biaxial by the application of an electrical field perpendicular to the uniaxial optic axis. When the field is removed, the composition naturally relaxes back into its optically uniaxial, homeotropic texture.

In new and growing areas of imaging technology, new methods, apparatus, compositions, and articles of manufacture are often discovered for the application of the new imaging technology in a new mode. The present invention relates to a new and advantageous system for imaging an electro-optic cell containing a dielectric anisotropic material in its optically uniaxial state.

SUMMARY OF THE INVENTION

It is, therefore, an object of this invention to provide a novel electro-optic system.

It is another object of this invention to provide a novel imaging system.

It is another object of this invention to provide a novel imaging system having improved speed.

It is still another object of the invention to use dielectric anisotropic materials in their optically uniaxial state in novel electro-optic cells and imaging cells.

It is another object of this invention to provide a dielectric anisotropic material in the optically uniaxial state that is quickly driven, by modifying applied electric fields, to another optical state at electrode edges.

It is yet still another further object of this invention to provide electro-optic imaging wherein the images produced are very pleasing to the eye owing to the uniform appearance of illumination.

Another object of this invention is to provide edge brightness images.

The foregoing objects and others are accomplished in accordance with this invention by providing a dielectric anisotropic material having optical uniaxiality, applying an electrical field and subsequently modifying the electrical field to incur misalignment of the composition at electrode edges to provide a change in optical properties at electrode edges.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 1:
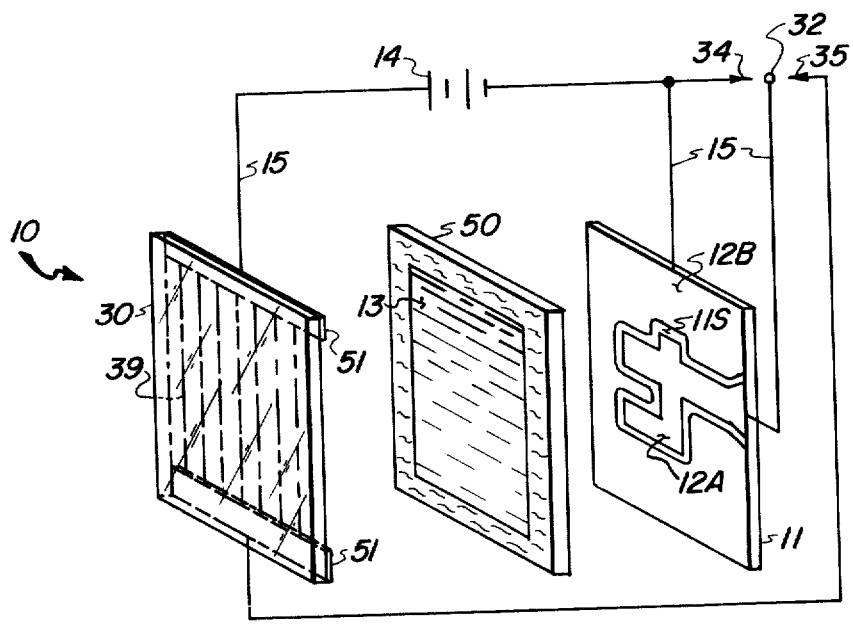
FIG. 1 is a partially schematic, exploded isometric view of an electro-optic cell embodying the present invention.

In FIG. 1 an embodiment of the novel electro-optic cell 10 of the present invention is shown in partially schematic, exploded isometric view. Substantially transparent plate 11 has a free insulating surface 11S separating character electrode 12A and background electrode 12B. The layer of dielectric anisotropic liquid crystalline composition 13 having optical uniaxiality occupies the volume defined by the plate 11, the plate 30 and the electrodes 12A and 12B. Substantially transparent plate 30 has a substantially transparent conductive coating of electrode grid lines 39 upon its contact surface, i.e., the surface in contact with liquid crystalline composition 13. A strip 50 of insulating gasket-type material may be used to close the ends of this small volume which defines the layer of liquid crystalline composition 13, to contain the composition within the volume between the plates 11 and 30. In operation, the electrodes are typically electrically connected by electrical leads 15 and 51 to a suitable voltage source such as voltage source 14 and to a switch such as, for example, switch 32 intermediate contacts 34 and 35. As seen in FIG. 1, when switch 32 is in electrical connection with contact 34, character electrode 12A on the surface of substantially transparent plate 11 is connected to one polarity of voltage source 14 with the grid line electrode 39 on the contact surface of substantially transparent plate 30 being connected to the other polarity of voltage source 14. When switch 32 is shorted with grid line electrode 39 in electrical connection with contact 35, background electrode 12B on substantially transparent plate 11 remains connected to said other voltage source 14 polarity. Thus it can be seen by means of switch 32, a potential difference with accompanying electrical fields exists between electrode 12A and electrodes 39, and between electrode 12B and electrodes 39 (contact 34), or, the potential differences with accompanying electrical fields exists between electrode 12B and electrode 12A, and electrodes 12B and 39 (contact 35). Upon switching from contact 34 to contact 35, the optical state of liquid crystalline composition 13 is first changed along the edges of the portions of grid line electrodes 39 which are over the character electrode 12A. If plate 30 is provided with only a single solid area electrode above character electrode 12A, rather than with grid line electrodes 39, the grounding of electrode 12A results in optical state change along the edge of character electrode 12A. Similarly, an image can be found at the edge of the background electrode 12B along its edge or grid line electrode edges over 12B upon similar switching of 12B. Furthermore, the edge imaging over and around 12A and 12B may be alternated by successively switching the common polarity of the voltage source from 12A to 12B to 12A, etc. With the single area electrode on plate 30, this successive switching results in the optical state change shifting from the character 12A edge to the background 12B edge and appears as though the character alternatively grows and shrinks. The voltage source can be either DC or pulsating DC or low frequency A.C.

In the electro-optic cells described herein, any suitable substantially transparent material such as, for example, glass; polyethylene; polyvinylchloride; Mylar, a polyester resin film available from DuPont; Teflon, a polytetrafluoroethylene film available from DuPont; or any other suitable substantially transparent material may be used for plates 11 and 30.

The electrodes 12A, 12B and 39 may comprise any suitable electrically conductive material. Such electrical conductors will typically have electrical resistivities in the range between about $10^{-8}$ and about $10^{-3}$ ohm-cm, although materials having resistivities outside this range will perform satisfactorily in various embodiments of the present invention. Typical conductive materials suitable for the use as electrodes herein include aluminum, copper, silver, gold, tin oxide, chromium and others. The thickness of the electrodes, that is the length of the dimension of the electrodes in the direction normal to the transparent surfaces, is typically not greater than about 100A.

Where it is desirable to use a strip of gasket-like material at the ends of the volume defined by the electrodes and the transparent surfaces, or in any other suitable fashion, any suitable substantially electrically insulating material may be used. Preferred gasket materials will typically be chemically inert, and possess the appropriate dielectric characteristics. Materials suitable for use as insulating gasket materials include cellulose acetate, cellulose triacetate, cellulose acetate butyrate, polyurethane elastomers, polyethylene, polypropylene polyesters, polystyrene, polycarbonates, polyvinylfluoride, polytetrafluorethylene, polyethylene terephthalate, mixtures thereof, and others.

The dielectric anisotropic material may comprise any suitable liquid crystalline material or any non-liquid crystalline material having suitable dielectric anisotropic characteristics. The desired effect, according to the invention is that the dielectric anisotropic susceptibility of the material allows the major axes of the molecules of the materials to be aligned substantially parallel to each other. The materials may have either a positive or negative dielectric anisotropic susceptibility; i.e., by conventional nomenclature, the positive dielectric anisotropic susceptible materials will align with their major axes of the molecules substantially parallel to the field and a negative dielectric anisotropic susceptible material will align with its long axes of the molecules substantially perpendicular to the field.

Any liquid crystalline substance or composition which will either exhibit in response to external stimuli, or inherently has, the optical uniaxiality of the uniaxial nematic mesophase may be used. "Uniaxial" means one preferred direction as described in "Fundamentals of Optics," Jenkins and White, McGraw-Hill, 1957, p. 498.

Typical suitable materials which will exhibit optical uniaxiality in response to external stimuli include cholesterics; mixtures of cholesterics and smectics; mixtures of nematics and cholesterics, such as about 80% by weight methoxybenzylidene-p-n butylaniline (MBBA) and 20% cholesteryl chloride (CC); and mixtures of nematics and optically active non-mesomorphic materials such as menthol or camphor. These materials and mixtures typically exhibit characteristics of the cholesteric mesophase and will undergo phase transformation to the optically uniaxial nematic mesophase state in response to suitable stimuli such as, for example, electrical field induced phase transformation as disclosed in U.S. Pat. No. 3,642,148 hereby incorporated by reference. Also, nematics will assume the optically uniaxial state in response to electric fields and in response to substrate treatment, such as rubbed substrates, as disclosed in P. Chatelain, Bull. Soc. Fr. Miner. Crist. 66, 105 (1943).

Typical suitable materials which inherently exhibit optical uniaxiality include doped nematics as disclosed in U.S. Pat. No. 3,687,515 hereby incorporated by reference and compensated mixtures of cholesterics.

The phrase "providing a dielectric anisotropic material having or capable of assuming under the influence of an electrical field, optical uniaxiality" is used herein to include all of the aforementioned methods of providing such materials in the optically uniaxial state.

Typical suitable liquid crystalline compositions which may be used along or in combination to achieve the characteristics desired in dielectric anisotropic composition or material 13 are listed in U.S. Pat. No. 3,622,224, Wysocki et al., especially column 3, line 18 through column 4, line 62; which patent is hereby incorporated by reference. Typical suitable liquid crystalline compositions which may be used alone or in combination to achieve the desired characteristics of dielectric anisotropic composition 13 are also listed in U.S. Pat. No. 3,652,148, Wysocki et al., especially column 4, line 59 through column 5, line 26, and U.S. Pat. No. 3,687,515, Hass et al. especially column 3, line 59 through column 4, line 62, both of which patents are hereby incorporated by reference.

Cholesteric liquid crystals have been found to have the property that when the propagation direction of plane polarized or unpolarized light is along the helical axis thereof, i.e., when the light enters in the direction perpendicular to the long axes of the molecules, white light is essentially unaffected in transmission through thin films of such liquid crystals except for a wavelength band centered about some wavelength $\lambda o$ where $\lambda o = 2np$ with $n$ representing the index of refraction of the liquid crystal substance and $p$ the pitch or repetition distance of the helical structure. The bandwidth $\Delta \lambda$ of the wavelength band centered about $\lambda o$ will typically be of the order of about $\lambda o/14$. For light of a wavelength $\lambda o$, the cholesteric liquid crystal, under these conditions, exhibits selective reflection of the incident light such that approximately 50 percent of the light is reflected and approximately 50 percent is transmitted (assuming negligible absorption which is usually the case) with both the reflected and transmitted beams being approximately circularly polarized. For light having wavelength around $\lambda o$ but not at $\lambda o$ the same effect is present but not completely. The transmitted light is not circularly polarized but instead is elliptically polarized. The cholesteric liquid crystals which exhibit this property of selective reflection of light in a region centered about some wavelength $\lambda o$ are said to be in the Grandjean or "disturbed" texture. If $\lambda o$ is in the visible spectrum the liquid crystalline film appears to have the color corresponding to $\lambda o$ and if $\lambda o$ is outside, it appears colorless.

Furthermore, depending upon the intrinsic rotary sense of the helical nature of the material, i.e., whether it is right-handed or left-handed, the light that is transmitted is either right-hand circularly polarized light (RHCPL) or left-hand circularly polarized light (LHCPL). The transmitted light is circularly polarized with the same sense of polarization as that intrinsic to the helical nature of this material. Thus a cholesteric liquid crystal having an intrinsic helical structure which is left-handed in sense will transmit LHCPL and one having a helical structure which is right-handed in sense will transmit RHCPL.

Hereinafter these cholesteric liquid crystal substances will be identified in accordance with popular convention, by the kind of light which is reflected at $\lambda o$. When a film is said to be right-handed it is meant that it reflects RHCPL and when a film is said to be left-handed it is meant that it reflects LHCPL.

Thus, a right-handed cholesteric liquid crystal substance transmits LHCPL essentially completely at $\lambda o$ whereas the same substance reflects almost completely RHCPL. Conversely a left-handed film is almost transparent to RHCPL at $\lambda o$ and reflects LHCPL. Since plane polarized or unpolarized light contain equal amounts of RHCPL and LHCPL, a cholesteric liquid crystal film is approximately 50 percent transmitting at $\lambda o$ for these sources when the liquid crystal is in its Grandjean texture.

It has been found that compensated cholesteric liquid crystal mixtures (mixtures of right and left handed components adjusted to approach or give infinite pitch) can adopt spontaneously an optical uniaxial configuration with the optic axis substantially perpendicular to the plane of the liquid crystal; such as, for example, a 50—50 percent by weight mixture of cholesteryl chloride and oleyl cholesteryl carbonate. Compensated cholesterics used as liquid crystalline composition 13 may be edge imaged as described above. Typically, the higher the applied voltage then the quicker the edge effect occurs and the more intense the edge effect becomes. This is denoted in FIG. 2 for the liquid crystalline mixture comprising about 60 percent by weight cholesteryl chloride and about 40 percent by weight cholesteryl nonanoate. The "time to respond" curve is plotted against the x-axis "applied voltage" and is read along the y-axis in seconds; the "amplitude" curve is plotted against the x-axis "applied voltage" and is read along the y-axis in relative units. Suitable means of modifying the electrical fields associated with the applied voltage, may include any means of altering the electrical fields which will result in the desired effect of changing the optical properties of the dielectric anisotropic material at electrode edges. Typical means include shorting or grounding the character or background electrodes; chopping or pulsing the applied electrical field; reducing or increasing the applied voltage and combinations thereof. The frequency at which the DC field is modified and the frequency of the AC field is not, as a practical matter, any problem because at about 30 pulsations per second, the edge effect appears to the human eye to be present all the time. Between about 20 to 30 pulsations per second, the ON and OFF nature of the edge effect or the presence and absence of the edge effect can be perceived by the human eye. In either situation, the viewing of the dielectric anisotropic material is typically done with transmitted light and through crossed polarizers. Reflection viewing is, of course, possible with appropriate optics and sample configuration.

The mechanism by which the edge effect is achieved and the mechanism of the influence on the dielectric anisotropic materials at the electrode edges by the modified electrical field is not known. However, it is believed that dielectrophoresis and electrophoresis do play a part at electrode edges upon modification of the applied electrical field. It is believed that when insulating areas are present, they become charged by ion flow. It is believed that when the conducting areas are subsequently shorted, removing the field, the insulating areas are now a source of electrophoretic particles and field which momentarily cause aligned molecules at electrode edges to lose their alignment causing the edge effect to occur.

As previously stated, the desired effect is an alteration in the optical property of the dielectric anisotropic material at the electrode edges. The nature of this alteration may be any suitable optical property change that can be detected by either the unaided human eye or with appropriate optical aids. Typical suitable changes include any optical phenomena or effect which changes the degree or state of polarization of light and that can be detected by viewing the dielectric anisotropic material between crossed polarizers; such as, for example, birefringence, optical activity, uniaxial to biaxial state changes, and dynamic scattering. Dynamic scattering is an example of an optical phenomena which can be observed by the unaided human eye when viewed off-axis with respect to the incident light rays; in which case the edge effect would appear white.

Figure 2:
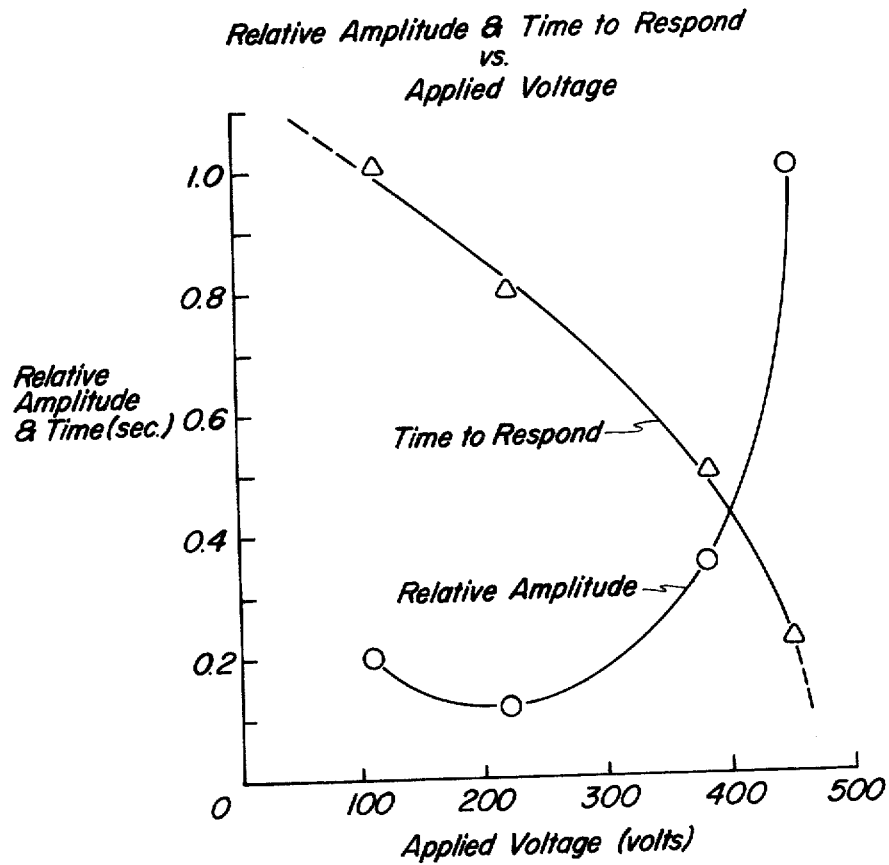
FIG. 2 is a graphic representation of the dependence of edge brightness light signal amplitude on applied voltage, and of edge brightness response time dependence on applied voltage, for an exemplary dielectric anisotropic cholesteric liquid crystalline mixture.
Figure 3:
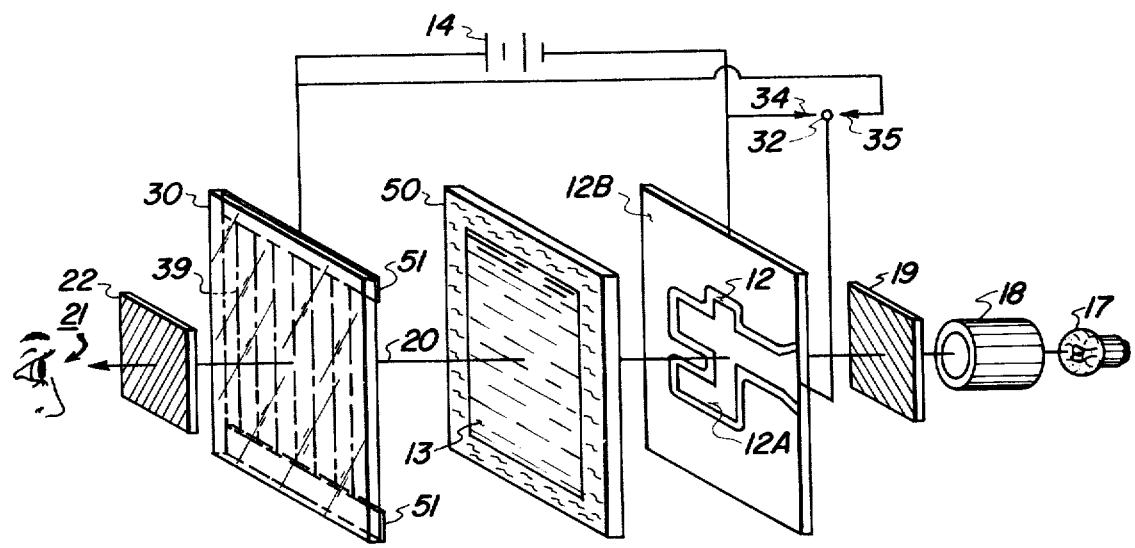
FIG. 3 is a partially schematic, exploded isometric view of an imaging system embodying the present invention.

As seen from FIG. 3, the surprising and advantageous effect of the present invention is typically observed by providing a source of collimated and linearly polarized light such as, for example, laser light. Alternatively, light source 17 which is preferably monochromatic and collimator 18, in a position normal to the plane of the layer of dielectric anisotropic material 13 may be used if the collimated light is then passed through a polarizer 19. The polarized light, here transmitted along line 20, enters the electro-optic cell parallel to the optic axis of the composition 13 when switch 32 is in electrical connection with contact 34. This position for switch 32 creates potential differences and associated electrical fields between character electrode 12A and grid electrodes 39. There electrical fields are perpendicular to the plane of composition 13, aligning the major axes of the molecules or particles of layer 13 substantially perpendicular to the plane of layer 13 for positive dielectric anisotropic materials and parallel to one another. Composition or mixture 13, under the influence of the electrical field, is now optically uniaxial and has its optic axis perpendicular to the plane of layer 13. Upon placing switch 32 in electrical connection with contact 35, an observer 21, on the opposite side of the electro-optic cell, observing the cell, through polarizer 22, crossed 90° with respect to polarizer 19, or the plane of laser light polarization in the direction normal to the plane of layer 13 and parallel to the optical axis of composition 13, will observe brightness lines at each side of grid line 39 along portions thereof overlapping character electrode 12A. Aligning the crossed polarizers 45° with respect to the electrode edge will enhance edge brightness detection in some cases, such as when birefringence is the optical property change soung along electrode edges. The remainder of the cell appears dark or black. The electro-optic cell is in its "ON" imaging state. To turn the electro-optic cell to its "OFF" imaging state, switch 32 is placed in electrical connection with contact 34 which makes the entire cell appear black. The presence of brightness lines at the electrode edges is herein referred to as edge brightness. The phenomena of edge brightness is typically transient in nature but dielectric anisotropic materials with memory can be exmployed to provide edge brightness memory as described in Example XVI, below. The typically transient edge brightness phenomena occurs at some time after modifications of the electric field as shown in FIG. 2, and then begins to decrease in brightness intensity, and within a fraction of a second, depending upon the material composition expires. It will be understood, of course, that the edge brightness effect depends upon the presence of light for the manifestation of optical property change at the electrode edges; and that the longevity, whether transient or memory in nature, depends upon the longevity of the optical property change in the dielectric anisotropic material at electrode edges after modification of the electrical field.

Although individual electro-optic cells have been described in conjunction with FIGS. 1–3, it will appreciated that grids or bit-matrices of coplanar electro-optic cells embodying the present invention and any suitable image or display configuration can be provided to exhibit the novel effect of the present invention.

Figure 4A:
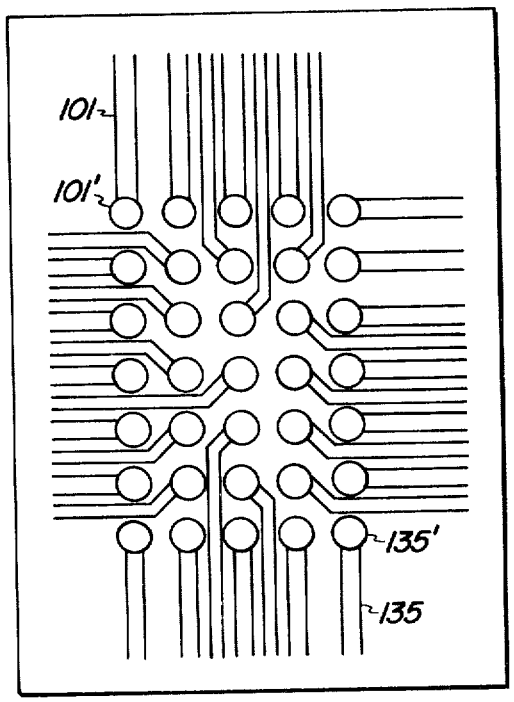
FIGS. 4A and 4B are top plan views of electrodes for an exemplary matrix edge brightness display.
Figure 4B:
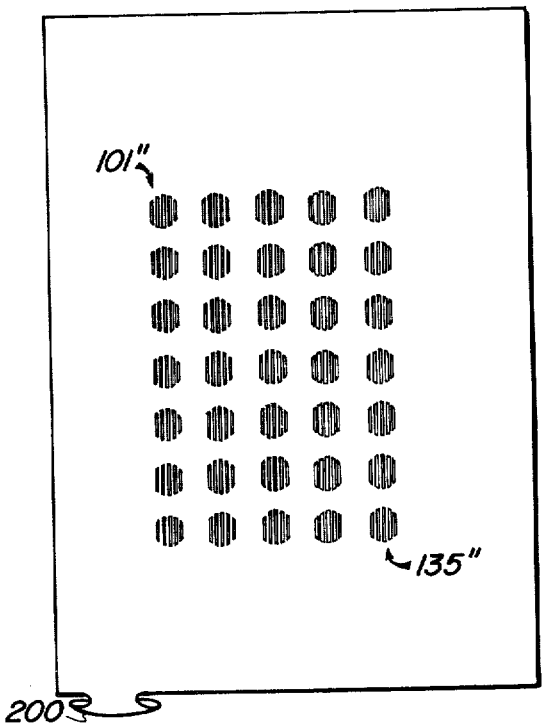

For example, one advantageous electro-optic cell configuration devised especially for use with the edge optical effect or edge brightness of the present invention comprises a matrix display as shown in FIGS. 4A & 4B. One electrode (FIG. 4A) comprises solid area circular electrodes 101' through 135' having their respective leads 101 – 135. This matrix may be conveniently formed by the photoresist, acid etch method applied to a uniformly coated insulating substrate such as, uniformly chromium coated glass slides. The second (FIG. 4B) electrode is a single solid electrode having a pattern of insulating line grids etched into its surface and is configured to be in registration with the round solid electrodes 101' through 135'. The line grid electrode is provided with a single lead 200. During imaging, electrical fields are established between all of the round solid area electrodes 101' through 135' and their respectively registered line grid patterns 101' through 135' on the line grid electrode. When viewed through cross polarizers, the entire electric-optic cell appear dark. Then by means of any suitable address system or other selective switch such as, for example, Selectroswitch Model number 91-1066-001, available from the Selectro Corporation, some of the circular solid electrodes are selectively shorted to their registered line grid patterns, thereby modifying their electrical field in the selected configuration. For example, in referring to FIG. 4, the numeral one can be displayed through edge brightness by selectively shorting all of the circular electrodes in vertical alignment with 101', with their respectively matching line grid patterns on the line grid electrode thereby causing edge brightness to occur on each side of the individual lines in the line grid patterns in vertical alignment with 101''. The edge pattern brightness may be either transient in nature or have memory, as previously described, depending upon the nature of the dielectric anisotropic material being imaged. Similarly, the number 11 may be formed by selectively shorting circular electrodes in vertical alignment with 101' and 135' to their matched and registered line grid patterns on the line grid electrode. Although the terms matrix electrode and line grid electrode are used herein, it will be understood that, with reference to FIG. 4A and 4B, the matrix electrode is and the line grid electrode may be, comprised of a multiplicity of individual electrodes; and that each one grid pattern on the line grid electrode may be comprised of several individual line electrodes residing on and surrounding by an insulating surface. It will be readily appreciated that with the matrix display shown in FIG. 4A and 4B, that virtually any letter, symbol, number, or other graphic representation can be approximated with selective electrical field modification. The line grid electrode of FIG. 4B may comprise grids vapor deposited through a mask on insulating substrates, or uniformly coated substrates having grids etched therein.

Figure 5:
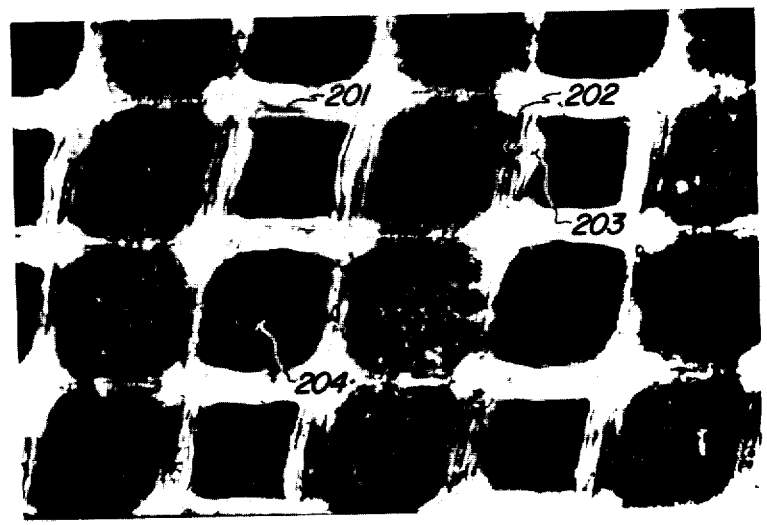
FIG. 5 is a black and white photographic reproduction of a color microphotograph of edge brightness for an exemplary dielectric anisotropic cholesteric liquid crystalline mixture in a cross-gridded electro-optic cell.

FIG. 5 is a black and white photographic reproduction of a color microphotograph of edge brightness in a cross-grid electro-optic cell. Electrode edges 201 cross electrodes edges 202 forming a cross-grid pattern. The light areas 203 corresponding to the cross-grid patterns is the electrode edge brightness effect. Darker areas 204 are portions of the dielectric anisotropic material 13 which has not undergone the optical property change of areas 203. In this photograph, material 13 is a cholesteric liquid crystalline mixture of about 60 percent by weight cholesteryl chloride and about 40 percent by weight cholesteryl nonanoate.

The following examples further specifically define the present invention with respect to dielectric anisotropic compositions, electro-optic cells and imaging systems, wherein the optically uniaxial dielectric anisotropic composition undergoes an optical property change at electrode edges. The parts and percentages are by weight unless otherwise indicated. The examples below are intended to illustrate the preferred embodiments of the novel electrode edge optical property change electro-optic system.

EXAMPLE I

An electro-optic cell is prepared as follows: A microscopic glass slide is coated with chromium by vacuum evaporation and acid etched through a photoresist pattern to produce an image area chrom electrode in the configuration of the numeral 4 and a background area electrode separated from the numeral by the etched glass surface. A 1 mil Mylar spacer is placed on the background area of the glass slide and is located along the entire periphery so as to retain any liquid crystalline material placed therein. A liquid crystalline composition comprising 60 percent by weight cholesteryl chloride and 40 percent by weight cholesteryl nonanoate is placed within the volume defined by the spacer. An electrode grid containing 65 line pairs per inch is made by acid etch through a suitable photoresist pattern on a second glass slide which is placed electrode side down in contact with the liquid crystalline composition. The electrode grid is connected to the negative terminal of a 500 volt source and the numeral 4 area and background area of the other electrode are both connected to the positive terminal of the voltage source. A 60 watt frosted-bulb light source is placed beneath the numeral-background electrode and the cell is viewed between crossed polarizers. The cell appears black.

The numeral 4 area is disconnected from the positive terminal of the voltage source and shorted to the grid electrode, under view between crossed polarizers, and the edges of the chrome lines in the grid electrode become momentarily bright where they cross over the numeral 4 electrode.

The numeral 4 electrode is so connected, disconnected and shorted many times in rapid succession. The composite of bright lines produces a uniformly bright numeral 4 image. Viewed closely the apparent uniformly bright numeral 4 image is seen to be composed of lines. At a distance, the uniformly bright numeral 4 image appears solidly bright. The time it takes for the cell to go from dark to bright is measured at less than 1/10 second. The dark to bright to dark cycle is repeated over 300,000 times at this speed without adverse effects.

EXAMPLE II

A character electrode for the numeral 7 prepared as in Example I and has background electrode areas; a top electrode comprising a solid chromium coating is prepared as in Example I and Example I is generally followed except that the character 7 electrode area and the background area electrode are so electrically connected to the same terminal of the voltage source that an electrical field exists either between the character 7 and top electrode or the background area electrode and top electrodes. Upon switching of the electrical fields at the rate of about 10/ second, an edge brightness pattern is observed at the edge of the character 7 when the field exists between it and the top electrode or an edge brightness pattern exists at the edge of the background area electrode adjacent the clear glass etched surface surrounding the character 7 when the electrical field exists between the background area electrode and the top electrode. During this fast switching, the character 7 appears to move in and out (toward and away from the viewer). This is caused by the edge brightness shifting over the clear glass etched surface from the character 7 edge to the background area electrode edge. The voltage is then increased from 500 volts to 600 volts and the edge brightness becomes greater in intensity as the voltage is increased.

EXAMPLES III – IX

Example I is followed except as follows: in Example III a ½ mil Mylar spacer is used; in Example IV the chrome grid electrode contains 200 chrome lines per inch and the Mylar spacer is ¼ mil thick; in Example V the chrome grid contains 200 lines per inch and a ½mil Mylar spacer is used; in Example VI the chrome grid contains 200 lines per inch; in Example VII the chrome grid contains 200 lines per inch and a 1 ½ mil Mylar spacer is used; and, in Example VIII the chrome grid contains 200 lines per inch and the Mylar spacer is 2 mils thick; and in Example IX the two electrodes are noncharacter electrodes and are each chrome grid electrodes in parallel registry and containing 200 lines per inch, and the Mylar spacer is ½ mil thick. The procedure of Example I is followed for each of Examples III – IX. It is observed that the edge brightness effect approaches and achieves the appearance of a solid bright area as the surface density of the chrome lines increases from 65 to 200; and that the edge brightness effect appears increased in intensity as the spacer thickness increases from ¼ mil and ½ mil to 1 mil and 1 ½ mils.

EXAMPLE X

The procedure of Example I is followed except that both electrodes are chrome grid electrodes, one oriented perpendicular to the other so that the grids are crossed. Mylar spacers of ¼, ½, 1, 1 ½ and 2 mils are successively used. The edge brightness patterns appear as dots when one grid electrode is grounded upon electrical disconnection from the positive terminal of the voltage source, and not as lines as was the case in Example IX where the two grids were parallel. It was observed that the edge brightness appeared to have greater density with thicker Mylar spacers, increasing monotonically with spacer thickness.

In Examples III – X, the edge brightness affect was observed in all cases and demonstrated that the edge brightness effect could be in the form of a line pattern, a cross pattern, dot pattern, combinations thereof, and indicates that virtually any shape of electrode would work provided the electrode contained edges within the area to be imaged.

EXAMPLE XI

A 5 × 7 matrix display as shown in FIG. 4A and 4B is prepared as follows:

A 2 and 4/10 inch by 3 and 7/10 inch by ⅛ inch chrome grid electrode is prepared by acid etch through a dot-grid line pattern in a photoresist overcoating a chromium coated glass plate. A 3 ½ inch by 5 inch by ⅛ inch, 5 by 7 matrix of solid dots is similarly prepared. The solid dots of the larger electrode are in size registry with the grid-dots of the smaller electrode. The solid dot matrix contains 35 selectively electrically addressed dot electrodes in a substantially rectangular pattern or of arrangement. The grid electrode comprises 35 similarly arranged patterns of grid lines in the pattern of dots. A ⅛ inch wide by 1 ½ mil thick Mylar rectangular gasket is sandwiched between the two electrodes along the peripheries thereof, provided with an opening and secured with epoxy glue. The cell is filled with a liquid crystalline composition comprising about 60 percent by weight cholesteryl chloride and about 40 percent by weight cholesteryl nonanoate by placing the cell at an angle above the liquid crystalline bath in a vacuum chamber that has a vacuum equivalent to 30 inches of Hg for 2 hours and jamming the cell into the bath at about 130°C. The vacuum in the vacuum chamber is maintained until no bubbles appear at the liquid crystalline surface. Maintenance of the vacuum is discontinued and air is allowed to enter causing the liquid crystalline composition to enter the cell. The cell is removed from the bath and allowed to cool to room temperature, and the Mylar spacing opening sealed with epoxy, and allowed to cure over night. When imaged according to the procedure of Example I, characters and numerals formed by the selective electrical addressing of the matrix-dot electrodes including selective ON and OFF switching of the voltage therebetween by shorting selected matched pairs of the matrix of grid dot electrodes, the character or numeral is generated by edge brightness illumination along the grid-dot edges which were selectively shorted.

EXAMPLE XII

Two chromium coated glass slides sandwich a liquid crystalline composition containing about 60 percent by weight cholesteryl chloride and about 40 percent by weight cholesteryl nonanoate at a temperature of about 44°C. Upon application of about 50 volts, the liquid crystalline material changes from a negative birefringent color figure to a positive birefringent color figure.

EXAMPLE XIII

Example XII is followed except that on one of the glass electrodes scratches are made in the chrome coating so as to remove the chrome coating in the scratched areas to reveal the glass surface underneath. Upon application of the voltage, the scratches transiently show up very vividly. The liquid crystalline composition does not act homogeneously over the entire area; the the scratched areas become birefringent while areas where the conductive coating is intact appear to be aligned with the electrical field.

EXAMPLE XIV

Example II is repeated except that the top electrode is insulating; i.e., it comprises a piece of glass with no conductive chromium coating. The voltage source is a DC source which is connected between the character 7 and the background area. Upon steady continued application of the DC voltage transformation of the liquid crystalline composition is obtained at the edge of the character 7 and at the edge of the background area. Transformation then slowly spreads into the area of character 7 and to much less extent into the background area.

EXAMPLE XV

Example XIV is repeated except that the voltage source is an AC voltage source electrically connected between the character 7 and background areas. Upon application of the AC voltage source, only the edge of the 7 and the edge of the background is transformed. After 1 hour of steady continued application of the AC voltage source, the edge transformation did not spread into the character 7 and background areas but remained only at the edges of the background and character areas.

Examples XIV and XV indicate that "ion" charging of the insulating top electrode occurs with steady continued application of DC voltage or the switching or pulsing of DC voltage, but not with AC voltage.

EXAMPLE XVI

The cross grid electrodes of Example X are used in sandwiching a liquid crystalline composition containing about 8% n-phenyl-l-napthylamine in 92% by weight of a mixture containing about 60 percent by weight cholesteryl chloride and about 40 percent by weight cholesteryl nonanoate. Viewed under a microscope between crossed polarizers, the liquid crystalline composition appears to be in the undisturbed or focal-conic state. Upon application of 200 volts, the composition transforms slowly with material moving and swirling at the edges of crossed grids. The electrical field is removed and it is observed that a very definite memory of the crossed grid pattern with particular emphasis of the edges thereof is present. The edges of the grid patterns are delineated by birefringent material while the inner (solid grid) portions of the composition are going to the Grandjean state when observed 2 ½ hours after removal of the electrical field. Eighteen hours after removal of the electrical field, all of the liquid crystalline composition appears to be in the Grandjean or disturbed state except for the edges of the grids which are in a birefrigent state. The edge brightness has not decreased in observable intensity.

Although specific components and proportions have been stated in the above description of the preferred embodiments of the advantageous electro-optic system of the present invention, other suitable materials and variations of the various steps in the systeme as listed herein may be used with satisfactory results and various degrees of quality. In addition, other materials and steps may be added to those used herein and variations may be made in the process to synergize, enhance or otherwise modify the properties of or uses for the invention. For example, various other compositions which are suitable for use in the present invention by having the capability of being or becoming optically uniaxial under an applied electric field and exhibiting the desired optical properties may be discovered and used in the system of the present invention and such compositions may require somewhat different thicknesses, electrical fields, temperature ranges and other conditions for preferred results with the present invention. Likewise, the various other means of creating electrical fields and other means of addressing the inventive imaging system may be used with satisfactory results.

It will understood that various changes in the details, materials, steps and arrangements of elements which have herein been described and illustrated in order to explain the nature of the invention, will occur to and may be made by those skilled in the art, upon a reading of this disclosure and such changes are intended to be included within the principle and scope of this invention.

For example, the field can be applied and modified by an x-y addressing system, especially in an electro-optic cell employing the electrodes of FIGS. 4A and 4B. Also, a photoconductor can be used to control the voltage to the dielectric anisotropic material, allowing optical control of the edge brightness image.

Another embodiment of the invention employs non-liquid crystalline materials and mixtures capable of discriminating in uniaxial alignment; such as mixtures of anisotropic particles in suitable carrier liquids. For example, about $500 \times 10^{-6}$ gms/cm$^2$ of graphite particles in castor oil or benzene; about $400 \times 10^{-6}$ gms/cm$^2$ of herepathite needles in iodoquinine-sulphate; about 50 gms/cm$^2$ of metal needles such as chromium or silver in Fluorolube MO-10 or S-65-70, available from Hooker Chemical Company or SOHIO Odorless Solvent 3440, available from Standard Oil of Ohio. Applied voltages are from about 1kV per cm thickness of dielectric anisotropic material for metallic needles to about 10 kV per cm. thickness of the other materials.

Other suitable anisotropic particles include ferromagnetic, ferroelectric, tourmaline (complex borosilicate of aluminum), calcite, and sulphur needles; lead carbonate flakes; cholesterol; azobenzene, anthracene and napthalene crystals.

Improvements in operation can be achieved by intentional addition of electrophoretic and dielectrophoretic particles to enhance the edge brightness effect.

What is claimed is:

1. An electro-optic method, comprising:
   a. providing a member comprising between two transparent electrodes a dielectric anisotropic material having, at least under the influence of an electrical field, optical uniaxiality; one of said electrodes having an imagewise portion separated from a background portion by an electrically insulating surface;
   b. providing an electrical field across said dielectric anisotropic material by applying a voltage between the other of said two electrodes and each of imagewise and background portions of said one electrodes; and
   c. removing the voltage between the imagewise portion of said one electrode and the other electrode; and applying a voltage between said imagewise and background portions of said one electrode.

2. The method of claim 1 wherein the dielectric anisotropic material comprises about 60 percent by weight cholesteryl chloride and about 40 percent by weight cholesteryl nonanoate.

3. The method of claim 1 wherein the dielectric anisotropic material comprises about 8 percent by weight N-phenyl-l-napthylamine and about 92 percent by weight of a mixture containing about 60 percent by weight cholesteryl chloride and about 40 percent by weight cholesteryl nonanoate.

4. The method of claim 1 wherein the dielectric anisotropic material is a liquid crystalline material.

5. The method of claim 1 wherein the liquid crystalline material comprises a compensated cholesteric liquid crystalline mixture.

6. The method of claim 1 wherein said dielectric anisotropic material is a cholesteric which, under the influence of the electrical field applied in step (b), assumes optical uniaxiality.

7. The method of claim 1 wherein said dielectric anisotropic material is a positive dielectric anisotropic material and in step (b) has its optic axis substantially parallel to the electrical field.

8. The method of claim 1 wherein said dielectric anisotropic material is a negative dielectric anisotropic material and in step (b) has its optic axis substantially normal to the electrical field.

9. The method of claim 1 further including the addition of either electrophoretic or dielectrophoretic particles to said dielectric anisotropic material.

10. The method of claim 1 wherein said dielectric anisotropic material comprises anisotropic particles in a carrier liquid.

11. An electro-optic method, comprising:
a. providing a member comprising between two electrodes a dielectric anisotropic material having, at least under the influence of an electrical field, optical uniaxiality; one of said electrodes being a transparent matrix electrode having a plurality of individually addressable solid area electrodes; the other of saiu electrodes being a transparent line grid electrode having a plurality of line grid patterns comprising conducting and insulating 2urfaces, said line grid patterns being in registry with said plurality of solid area electrodds;
b. providing an electrical field across said dielectric anisotropic material by applying a voltage between at least one of the solid area electrodes and the line grid pattern in registry therewith; and
c. electrically connecting said at least one solid area electrode and the line grid pattern in registry therewith.

12. An electro-optic display, comprising:
a. a transparent matrix electrode having a plurality of individually addressable solid areas electrodes;
b. a transparent line grid electrode having a plurality of line grid patterns comprising conducting and insulating surfaces, said line grid patterns being in registry with said plurality of solid area electrodes;
c. a dielectric anisotropic material sandwiched between said matrix electrode and said line grid electrode, said dielectric anisotropic material having, at least under the influence of an electrical field, optical uniaxiality;
d. means for providing an electrical field across said dielectric anisotropic material by selectively applying a voltage between at least one of the solid area electrodes and the line grid patterns in registry therewith; and
e. means for selectively electrically connecting said at least one of said solid area electrodes and the line grid pattern in registry therewith.

13. The display of claim 12 wherein the solid area electrodes are substantially circular dots and the grid-line electrode patterns are dot patterns.

14. The apparatus of claim 12 further including polarizers crossed at about 90°, on opposite sides of the matrix electrode-dielectric anisotropic material-line grid electrode sandwich; and a source of collimated light oriented so that the collimated beam provided by said source is substantially normal to the polarizers.

15. An electro-optic display, comprising:
a. A first transparent electrode comprising an imagewise portion separated from a background portion by an electrically insulating surface;
b. a second transparent electrode having a plurality of alternating conductive and insulating grid lines;
c. a dielectric anisotropic material sandwiched between said first and second electrodes; said dielectric anisotropic material having at least under the influence of an electrical field, optical uniaxiality.
d. means for applying an electrical field across said dielectric anisotropic material comprising a voltage source, one polarity of said voltage source being in electrical connection with said second electrode and the other polarity of said voltage source being in electrical connection with the background portion of said first electrode; and
e. means for selectively electrically connecting said imagewise portion of said first electrode to either of said voltage source polarities.

16. The display according to claim 15, further including polarizers crossed at about 90°, on opposite sides of the display; and a source of collimated light oriented so that the collimated beam provided by said source is substantially normal to the polarizers.

* * * * *

UNITED STATES PATENT AND TRADEMARK OFFICE
CERTIFICATE OF CORRECTION

PATENT NO. : 3,930,719
DATED : January 6, 1976
INVENTOR(S) : Robert W. Madrid and Joseph J. Wysocki It is certified that error appears in the above-identified patent and that said Letters Patent are hereby corrected as shown below:

Column 1, line 38: "appear" should read --appears--.

Column 2, line 41: "disclsed" should read --disclosed".

Column 8, line 51: "soung" should read --sought--.

Column 12, line 1: "affect" should read --effect--.

Column 14, line 13: "will understood" should read --will be understood--.

Signed and Sealed this

Seventeenth Day of August 1976

[SEAL]

Attest:

RUTH C. MASON
*Attesting Officer*

C. MARSHALL DANN
*Commissioner of Patents and Trademarks*